US00RE34577E

United States Patent [19]

Habing et al.

[11] E Patent Number: Re. 34,577

[45] Reissued Date of Patent: Apr. 5, 1994

[54] EXERCISE APPARATUS

[75] Inventors: Theodore G. Habing, Long Beach; Norman M. Richards, Orange, both of Calif.

[73] Assignee: Pacific Fitness Corporation, Cypress, Calif.

[21] Appl. No.: 901,819

[22] Filed: Jun. 22, 1992

Related U.S. Patent Documents

Reissue of:

[64] Patent No.: 4,844,456
Issued: Jul. 4, 1989
Appl. No.: 96,854
Filed: Sep. 14, 1987

[51] Int. Cl.[5] ..... A63B 21/00

[52] U.S. Cl. ..... 482/138; 482/100; 482/102; 482/136; 482/137; 482/142

[58] Field of Search ..... 482/98, 99, 100, 104, 482/133, 135, 136, 137, 138, 142, 908, 99, 101, 102, 103

[56] References Cited

U.S. PATENT DOCUMENTS

| | | | |
|---|---|---|---|
| 4,169,626 | 10/1979 | Hollar, Jr. | 297/378 X |
| 4,199,139 | 4/1980 | Mahnke et al. | 482/101 |
| 4,227,689 | 10/1980 | Keiser | 482/137 X |
| 4,286,782 | 9/1981 | Fuhrhop | 482/104 X |
| 4,316,609 | 2/1982 | Silberman | 482/133 X |
| 4,358,108 | 11/1982 | Voris | 482/99 X |
| 4,390,179 | 6/1983 | Szkalak | 482/138 X |
| 4,407,495 | 10/1983 | Wilson | 482/138 X |
| 4,456,246 | 6/1984 | Szabo | 482/99 X |
| 4,505,475 | 3/1985 | Olschansky et al. | 482/100 |
| 4,603,855 | 8/1986 | Sebelle | 482/133 X |
| 4,634,127 | 1/1987 | Rockwell | 482/98 X |
| 4,637,608 | 1/1987 | Owens et al. | 482/142 X |
| 4,793,608 | 12/1988 | Mahnke et al. | 482/142 X |

FOREIGN PATENT DOCUMENTS

| | | | |
|---|---|---|---|
| 3205581 | 8/1983 | Fed. Rep. of Germany | 482/102 |
| 2106399 | 4/1983 | United Kingdom | 482/142 |

OTHER PUBLICATIONS

"World Gym Instructional Book" distributed by Ed McKenna, Newport Beach, Calif.

*Primary Examiner*—Robert Bahr
*Attorney, Agent, or Firm*—Blakely, Sokoloff, Taylor & Zafman

[57] ABSTRACT

An exercise apparatus for performing a variety of exercises, including chest and incline shoulder press exercises during which the user sits on a seat with a backrest which is adjustably secured in upright and forwardly inclined positions for supporting the user's upper body in the proper positions for these exercises. The exercises all utilize the same weight stack or other device for resisting the exercise motions of the user. The apparatus has a plurality of exercise members mounted on a frame for different prescribed exercise movements by the user, a resisting force producing arrangement, and a cable for selectively connecting the resisting force to the different exercise members. The cable is guided and supported by pulleys, one of which is adjustable from one position to another to accommodate the different exercises.

7 Claims, 3 Drawing Sheets

EXERCISE APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to exercise equipment and more particularly to a novel exercise apparatus for performing a variety of exercises all utilizing the same resisting force producing means for resisting the exercise movements of the user.

2. Prior Art

The ever increasing popularity of physical fitness has led to the development of a vast assortment of exercise devices. These devices range from the very simple, such as dumbbells, jump ropes, and the like, to relatively complicated and sophisticated exercise machines or apparatus designed for the performance of several different exercises. The present invention provides a novel exercise apparatus of this latter kind.

Exercise apparatus of the kind to which this invention pertains utilize various means to provide the required resisting forces for the various exercises which may be performed on the apparatus, that is the forces for resisting the exercise movements of the user. In some cases, these forces are developed by spring. In other cases, weights provide the required resisting forces. These weights are generally adjustable to vary the resisting force. Weights have the advantage over springs of providing relatively smooth and uniform resisting forces which remain essentially constant throughout the range of movement of the exercise members.

SUMMARY OF THE INVENTION

This invention provides improved exercise apparatus for performing several different exercises all of which utilize the same means to provide the required resisting forces for the exercises. As will appear from the ensuing description, the present invention may utilize either weights or springs to provide this resisting force. The preferred resisting force means, however, and that utilized in the disclosed and presently preferred embodiment of the invention is a weight stack.

The exercise apparatus of the invention may be designed to perform various exercises. The presently preferred embodiment of the invention, for example, may be used to perform chest and shoulder press exercises, a leg extension exercise, a pectoral fly exercise, and a variety of other leg, arm, and body exercises. All of these exercises utilize the same means, preferably a weight stack, for providing required resisting force for the exercises.

To this end, the exercise apparatus of the invention has a plurality of exercise members mounted on a common frame for different prescribed exercise movements relative to the frame corresponding to the different exercises to be performed on the apparatus. In the disclosed and presently preferred embodiment of the exercise apparatus, for example, these exercise members are a pivoted chest and shoulder press exercise arm, a pivoted leg extension exercise arm, and a pair of pectoral fly exercise arms. A single weight stack is supported on the frame for vertical movement relative to the frame and is attached to a cable which may be selectively connected to the exercise members in such a way that the exercise movements of these members raises and lowers the weight stack to resist such movements. This single weight stack is utilized in all of the exercises which may be performed on the apparatus.

According to an important feature of the preferred embodiment of the invention, the weight stack cable is supported and guided by an upper pulley mounted adjacent the top of the frame above the weight stack and a lower pulley mounted adjacent the bottom of the pulley with the cable extending upwardly from the weight stack over the top pulley and then downwardly under the bottom pulley to the particular exercise member(s) to which the cable is attached. The bottom pulley is adjustable between a first position in which the weight stack cable may be attached to the chest and shoulder press arm without obstructing the chest and shoulder press exercise and another position or other positions for accommodating the other exercises to be performed on the apparatus.

Mounted on the apparatus frame are seats for supporting the user while performing certain of the exercises, such as the chest and shoulder press exercises, leg extension exercise, and pectoral fly exercise of the preferred embodiment. According to an important feature of the invention, the seat for the press exercises has a backrest which is adjustable between upright and forwardly inclined positions for supporting the user's upper body in the proper attitude for the chest and inclined shoulder press exercises, respectively.

According to a further feature of the invention, the weight stack cable may be releasable from all of the exercise members for engagement with a user's hand, leg, or body to perform various other leg and body exercises.

DESCRIPTION OF THE PREFERRED EMBODIMENT

Figure 11:
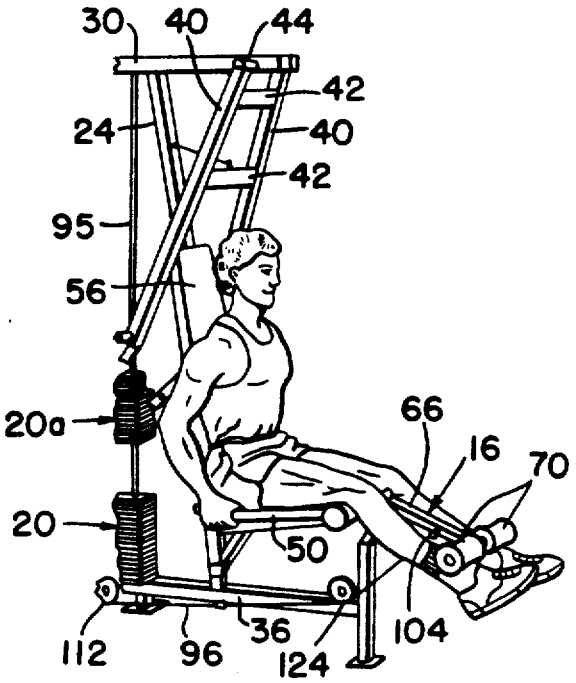
FIG. 11 illustrates the exercise apparatus being used to perform a leg extension exercise.

Turning now to these drawings, the illustrated, presently preferred exercise apparatus 10 of the invention has a frame 12 mounting a number of exercise members 14, 16, and 18. These exercise members are operable, by a user, through prescribed exercise movements, relative to the frame 12 and corresponding to the different exercises which may be performed on the apparatus. The particular exercise members shown are a chest and shoulder press exercise arm (item 14) for performing chest and shoulder press exercises (FIGS. 1 and 2), a leg extension exercise arm (item 16) for performing a leg extension exercise (FIG. 11) and pectoral fly exercise arms (items 18) for performing a pectoral fly exercise (FIG 9). Other exercises, such as those depicted in FIGS. 6 through 8, may be performed on the exercise apparatus, as well.

Also mounted on the apparatus frame 12 is a single means 20 for providing an adjustable resisting force for all of the exercises which may be performed on the exercise apparatus 10. As noted earlier, this resisting force means may comprise a string or weight. The preferred resisting force means, however, is the illustrated weight stack. For this reason, the resisting force means 20 will be hereinafter referred to as a weight stack.

Attached to the weight stack 20 are cable means 22 for selectively connecting the weight stack to the exercise members 14, 16, and 18, as shown in FIGS. 1 through 5 and 9, and for engagement by the user's hand, legs, or other body part, when performing other exercises such as those shown in FIGS. 1 through 8. The cable means 22 are arranged in such a way that the exercise movements of the exercise arms 14, 16, and 18 in FIGS. 1 through 5, 9 and 10, and of the user's hands and legs in FIGS. 6 through 8, raises and lowers the weight stack 20 whereby the latter provides a resisting force for all of the exercises performed on the apparatus. The effective weight of the weight stack is adjustable to vary this resisting force.

Seat means 23 are provided on the frame 12 for seating the user while performing various exercises. In the particular exercise apparatus shown this seat means includes a seat 23a which is used when performing the chest and shoulder press exercises and the leg extension exercise and a seat 50 which is used when performing the pectoral fly exercise.

Referring now in more detail to the drawings, the apparatus frame 12 is essentially a tripod frame including three generally upright frame members 24, 26, 28 joined at their upper ends by a top frame part 30. Adjacent the bottom of the frame 12 is a T shaped base frame section 32. This base frame section includes a frame member 34 extending between and joined to the upright frame members 26, 28 adjacent their lower ends and a transverse frame member 36 extending laterally from the center of frame member 34 toward and beyond the upright frame member 24. The lower end of the frame member 24 is secured to the frame member 36. Joined to the outer end of the lateral frame member 36 is an upright leg 38. The lower end of this leg and the lower end of the upright frame members 26, 28 form three support feet for the frame 12.

The chest and shoulder press exercise arm 14 hangs downwardly from the top frame part 30 to the right (in FIG. 1) of the upright frame member 24. This press arm includes side bars 40 rigidly joined near their upper ends and at their centers by cross bars 42. The upper ends of the side bars 40 are hinged at 44 to the top frame part 30 for swinging of the lower end of the press arm 14 generally lengthwise of the base frame member 36 and toward and away from the upright frame member 24. Fixed to the lower ends of the press arm side bars 40 are handles 46 and 48 to be selectively gripped by the user. Handles 46 extend laterally from opposite sides of the press arm. Handles 48 extend downwardly from the press arm.

The seat 23a for supporting the user when performing chest and shoulder press exercises includes a seat member 50 situated below the press arm 14 and a backrest rest 52. Seat member 50 has a rear end secured to the upright frame member 24 and an opposite front end secured to the upper end of the frame leg 38. Backrest 52 is hinged along its lower edge at 54 to the upper frame member 24 a sprawled distance above seat member 50. The backrest 52 is rotatably adjustable about its lower pivot axis between its generally upright position of FIGS. 1 and 3A and its forwardly inclined positions, relative to the seat member 50, shown in FIGS. 2, 3B and 3C.

Secured to and extending rearwardly from the rear side of the backrest 52 is a support member 56 having means 58 engagable with the upright frame member 24 for retaining the backrest 52 in its various positions of adjustment. The particular support member 56 shown is a yoke having arm 60 which straddle the frame member 24. The backrest support means 58 is a pin which is selectively insertable through holes 62, 64 in the yoke arm 60 for engagement with the frame member 24, as shown best in FIGS. 1, 3A, 3B, and 3C, to retain the backrest 52 in its various positions of adjustment.

The leg extension exercise arm 16 comprises a depending bar 66 hinged at its upper end to the upper end of the frame leg 38 and located forwardly of the leg relative to the seat 23a. Extending laterally from opposite sides of the lower end of the bar 66 are two shafts 68 (only one shaft visible) mounting generally cylindrical leg cushions or pads 70. The chest and shoulder press exercises and the leg extension exercise will be explained presently.

Figure 1:
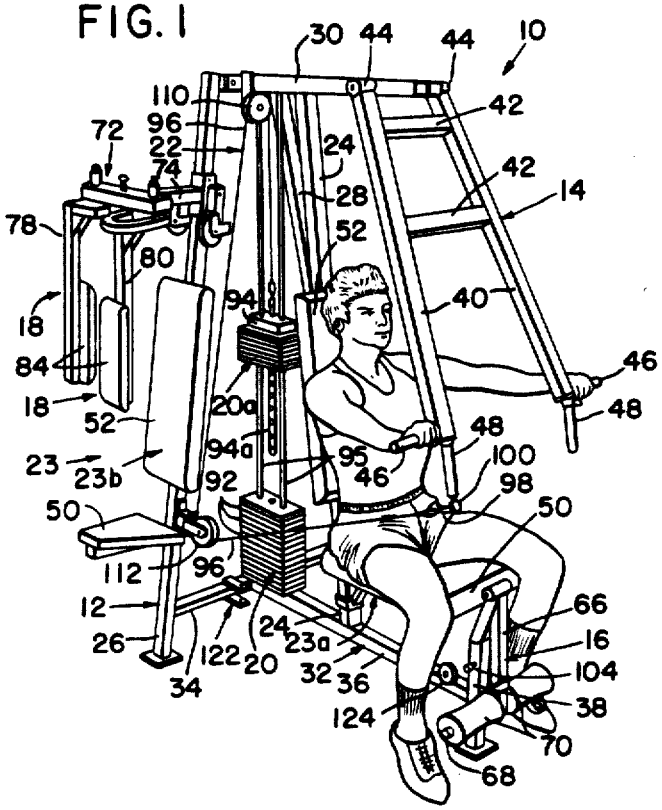
FIG. 1 is a perspective view of a presently preferred exercise apparatus according to the invention.

The pectoral fly exercise arms 18 are pivotally mounted on a support 72 rigidly attached to the left hand upright frame member 26 in FIG. 1. Support 72 comprises a bar 74 extending horizontally out from and rigidly secured to the frame member 26 and a horizontal cross bar 76 rigid on the outer end of the bar 74. The pectoral fly exercise arms 18 comprise vertical bars 78 having inclined upper ends 80. These upper right angle ends 80 of the bars 78 are pivotally connected at 82 to opposite ends of the support bar 76 for rotation of the pectoral fly arms 18 on vertical axis laterally offset from the arms. Mounted on the fly arms are cushions or paths 84, and rigid on the upper ends of the arms are curved cable guides 86 concentric with the pivot axes of the arms.

The pectoral fly exercise seat 50 comprises a seat member 88 and a backrest 90 mounted on the upright frame member 26 below the pectoral fly exercise arms 18. The pectoral fly exercise using these arms will be explained presently.

Weight stack 20 comprises a multiplicity of relatively flat, individual weights 92 placed one on top of the other and a top coupling weight 94 at the top of the stack. Means 94a are provided for selectively coupling any number of the individual weights 92 to the top of coupling weight 94 to form an effective exercise weight stack 20a. Weight stack 20 is supported on vertical rods 95 attached to the frame 12 for vertical movement relative to the frame.

As mentioned earlier, an important feature of the invention resides in the fact that all of the exercises which are performed on the present exercise apparatus utilize the one weight stack 20 (actually the effective weight stack 20a) to provide a resisting force for the exercises. To this end, the cable means 22 for selectively connecting the weight stack to the exercise members 14, 16, 18 and to the user in FIGS. 6, 7, and 8 comprises a cable 96 attached at one end to the top coupling weight 94 of the weight stack 20. Means are provided for selectively and releasably connecting the other end of this weight stack cable to the exercise members 14, 16, 18 and to the user in FIGS. 6, 7 and 8. In the particular exercise apparatus disclosed, this latter means comprises the structural elements described below.

On the latter end of the weight stack cable 96 is a coupling member 98, such as a snap hook. When performing the chest press exercise of FIG. 1, this coupling member or hook is attached to a mating coupling member 100, such as a ring, on the lower end of one press bar handle 48. When performing the shoulder press exercise of FIG. 2, the cable coupling member 98 is attached by a chain 102 to the press bar coupling member 100. This chain serves merely to extend the effective length of the weight stack cable 90.

When performing a leg extension exercise, the weight stack cable 96 is attached to a coupling member 104, such as a bolt, on the leg extension arm 16. This ring is located between the upper pivot axis of the arm and its lower leg pads 70.

When performing a pectoral fly exercise, the weight stack cable 96 is attached to cables 106 secured to the pectoral fly exercise arms 18. One end of the cables 106 extend about and are secured at their extreme ends to the curved cable guides 86 of the pectoral fly arms 18. The opposite ends of the fly arm cables 106 are attached to a coupling member 108, such as a ring, adapted for releasable engagement with the weight stack cable coupling member or spring link 98.

The weight stack cable 96 is supported and guided by pulleys 110 and 112 on the apparatus frame 12. Pulley 110 is an upper pulley which is mounted on the upper end of the frame 12 above the weight stack 20. Pulley 112 is a lower pulley which is adjustable or movable between its position of FIGS. 1, 4 and its positions of FIGS. 5 through 9. To this end, the pulley 112 is rotatably supported between the arms of a yoke shaped bracket 114 having a bearing 115 at its closed end. Mounted on the upright frame member 26 adjacent the pectoral fly exercise seat 23b is a pulley mounting bracket 116. This pulley mounting bracket has upper and lower arms 118 for receiving therebetween the closed end of the pulley bracket 114. A coupling/pivot pin 120 is insertable through holes in these arms and the pulley bracket bearing 115 to pivotally mount the pulley 112 on the frame member 26 in the position of FIGS. 1 and 4, with the pulley bracket pivot axis generally vertical. A second pulley mounting bracket 122 is attached to the lower frame bar 26 for pivotally mounting the pulley 112 in its position of FIGS. 5 through 9.

The manner in which the exercise apparatus 10 is used will now be explained.

When performing the shoulder press exercise of FIG. 1, the weight stack cable 96 is attached to the coupling member or ring 100. The adjustable cable pulley 112 is mounted in its position of FIG. 1, on the upright frame member 26. The backrest 52 of the seat 23a is placed in its upright position of FIG. 3A, against the upright frame member 24. The user sits on the seat 23a, with his upper body against the backrest 52, and hence in an upright position, and grips the press arm handles 46. The user then moves the press arm 14 back and forth against the resistance of the effective weight stack 20a.

It is significant to note here that the pulley 112, when mounted in its position of FIG. 1, is offset to one side of the user so that the weight stack cable 96 extends to one side of the user and thus does not obstruct the movements of the user during the chest press exercise.

Figure 2:
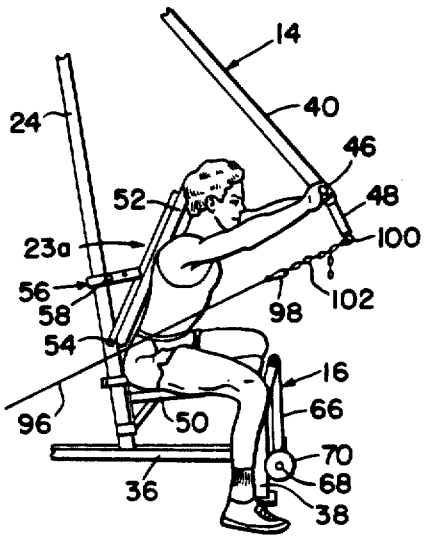
FIG. 2 is a fragmentary side elevation of a chest and shoulder press exercise station of the apparatus.
Figure 3A:
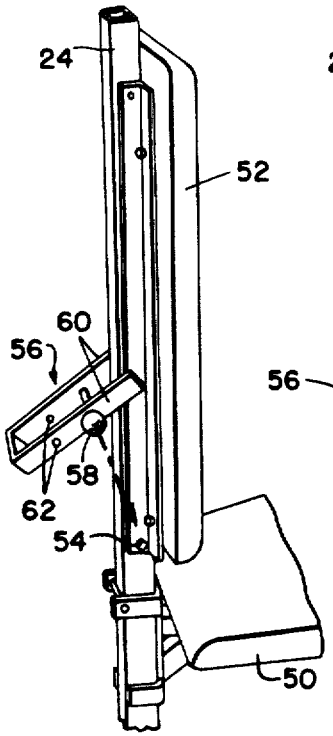
FIGS. 3A, 3B, and 3C are enlarged fragmentary perspective views of a seat for supporting a user when performing chest and shoulder press exercises on the apparatus and illustrating the back rest of the seat in three different positions of adjustment.
Figure 3B:
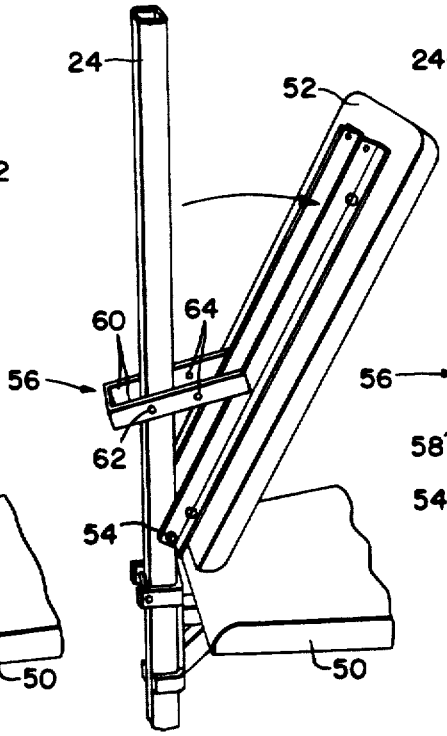
Figure 3C:
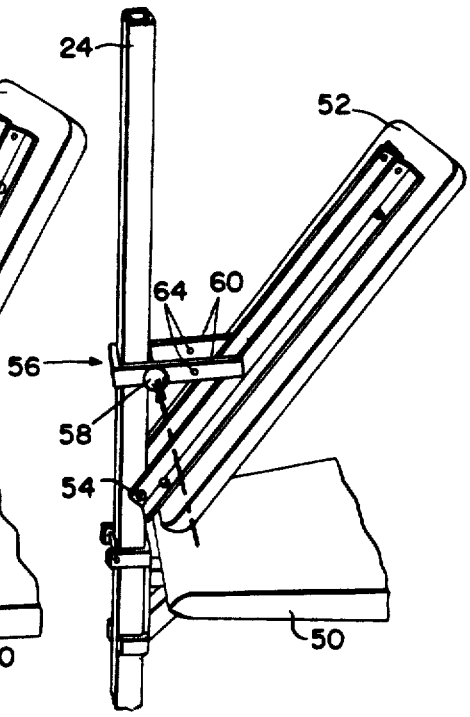

When performing the incline shoulder press exercise of FIG. 2, the backrest 52 of the seat 23a is adjusted to a forwardly inclined position, as shown in FIG. 2, and the weight stack cable 96 is attached, by the chain 102, to the press arm 14. The user sits on the seat 23a with his upper body against the backrest 52 and hence disposed in an forwardly inclined attitude. The user grips the press arm handles 46 or 48 and moves the press arm 14 back and forth against the resistance of the effective weight stack 20a, in somewhat the same manner as in the chest press exercise of FIG. 1.

Figure 10:
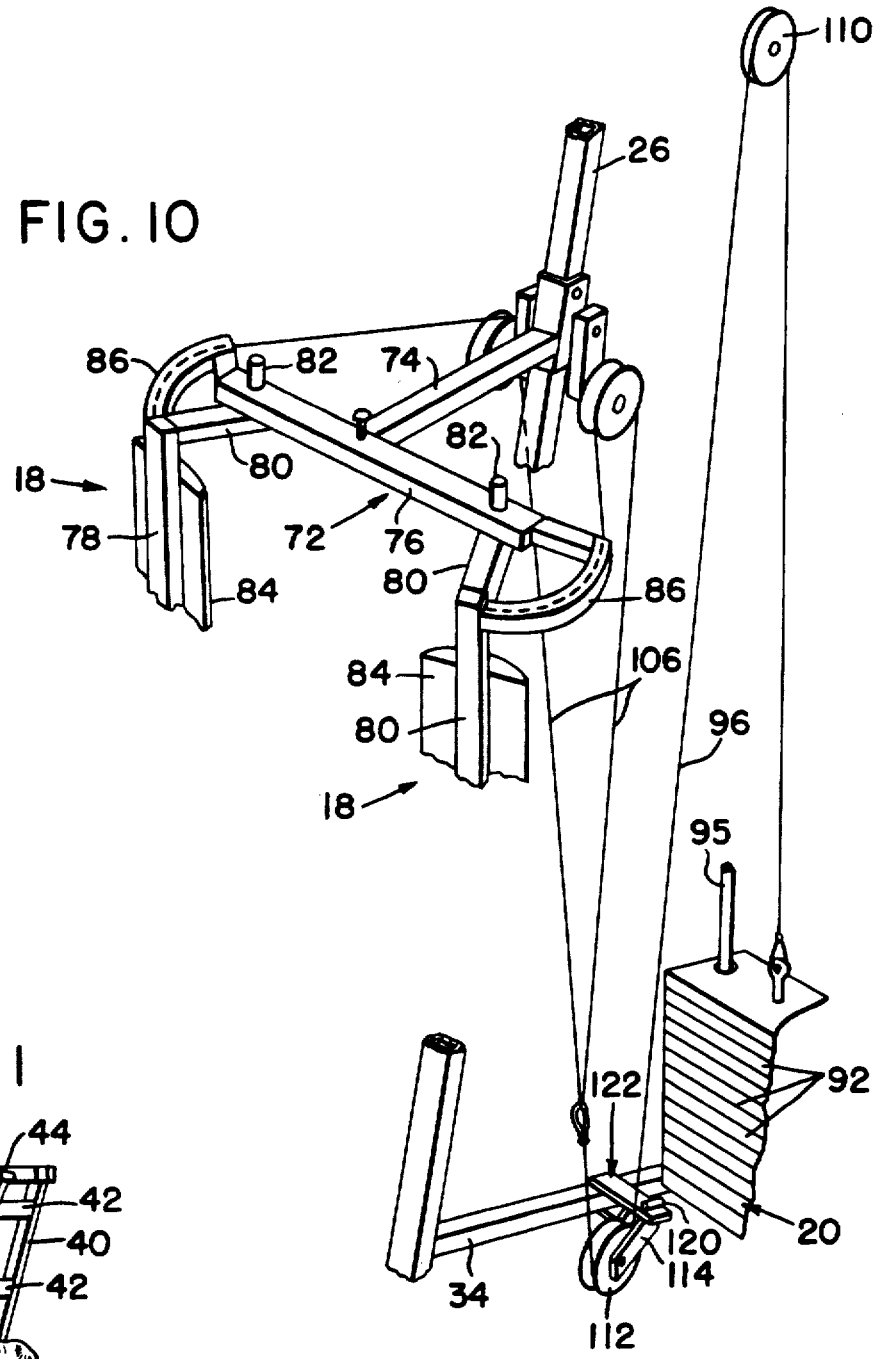
FIG. 10 is an enlarged fragmentary perspective view of a pectoral fly exercise station of the apparatus.

When performing the leg extension exercise of FIG. 10, the press arm 14 is secured in a rearward position behind the seat 23a. The backrest 52 of this seat is adjusted to its upright position. The lower adjustable cable pulley 112 is placed in its position of FIG. 5 and the weight stack cable 96 is extended around a pulley 124 on the lower frame bar 36 and connected to the coupling member or bolt 104 threaded into leg extension exercise arm 16. The user sits on the seat 23a, in the same position as shown in FIG. 1, and engages the lower ends of his legs with the rear sides of the leg extension arm pads 70. The user then flexes his legs and knees to rotate the leg extension exercise arm 16 back and forth against the resistance of the effective weight stack 20a.

When performing the pectoral fly exercise of FIG. 9, the weight stack cable 96 is attached to the coupling member or ring 108 on the fly arm cables 106, as shown in FIG. 10. The lower adjustable pulley 112 is left in its position of FIG. 5. The user sits on the seat 23b with his forearms pressing against the pads 84 of the fly arms 18 and with his hands gripping these arms, as shown in FIG. 9. The user then rotates these arms about their pivots 82 and against the resisting force of the effective weight stack 20a.

Figure 4:
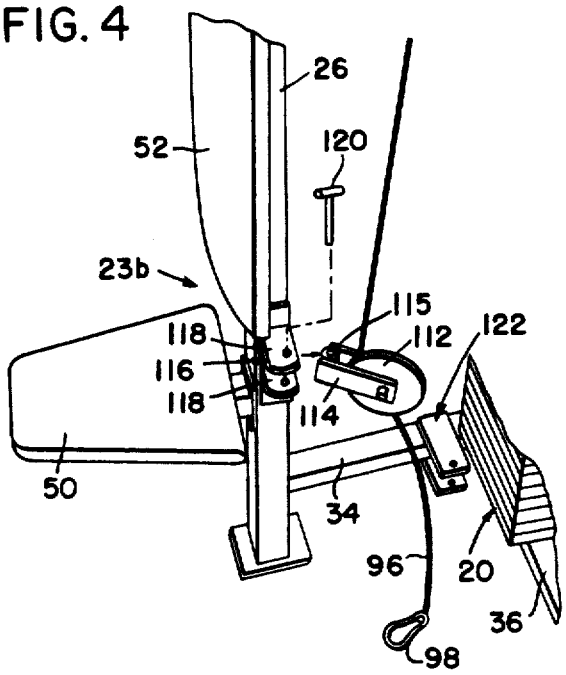
FIG. 4 is an enlarged fragmentary perspective view illustrating an adjustable lower cable pulley of the apparatus.

It is significant to note here that in the chest and shoulder press exercises of FIGS. 1 and 2, it is necessary to mount the lower adjustable cable pulley 112 in its offset position of FIGS. 1, 2 and 4 in order to locate the weight stack cable 96 at one side of the user and thereby prevent the cable from obstructing the user's movements during the chest and shoulder press exercises. This requirement does not exist in the pectoral fly and leg extension exercises of FIGS. 9 and 10. Accordingly, in these latter exercises, the adjustable pulley 112 may be mounted in its position of FIGS. 5 and 9 wherein the pulley is optimally located for attachment of the weight stack cable 96 to both the leg extension exercise arm 16 and the pectoral fly exercise arm cables 106.

Figure 5:
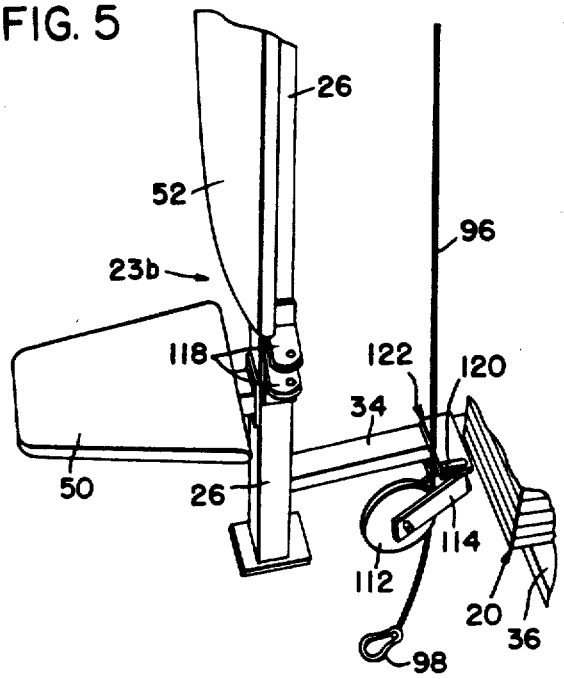
FIG. 5 is a view similar to FIG. 4 illustrating one position of adjustment of the lower pulley.
Figure 6:
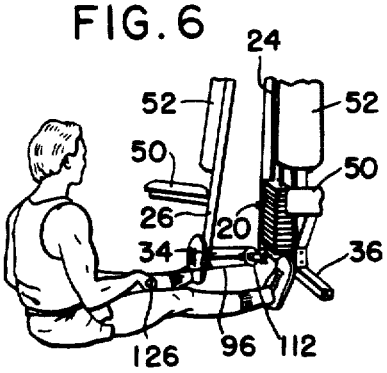
FIGS. 6, 7 and 8 illustrate certain arm and leg exercises which may be performed using the exercise apparatus.
Figure 7:
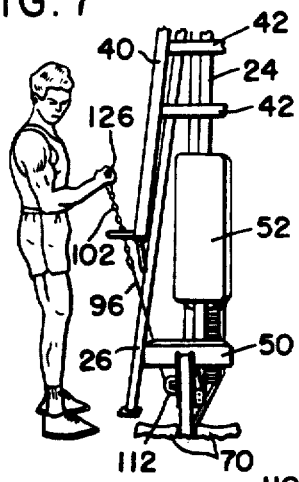
Figure 8:
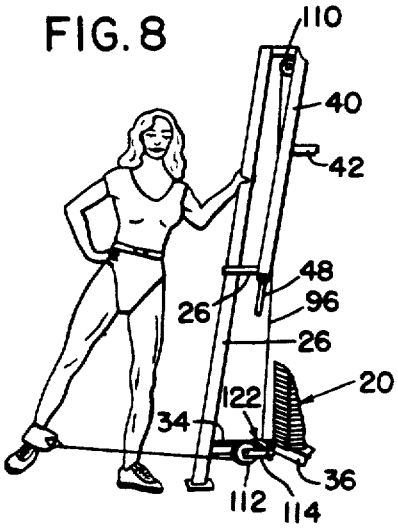
Figure 9:
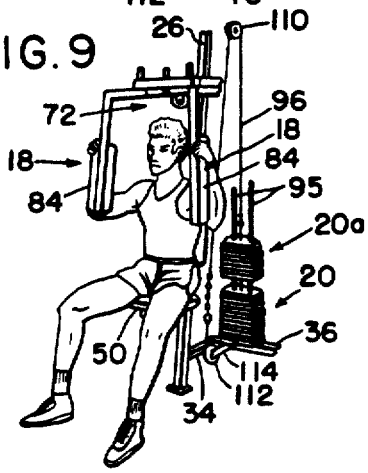
FIG. 9 illustrates the apparatus being used for a pectoral fly exercise.

The lower adjustable pulley 112 is also mounted in its position of FIG. 5 when performing the leg and arm exercises of FIGS. 6 through 8. Performing the arm exercises of FIGS. 6 and 7, the weight stack cable 96 is attached to a cross bar handle 126 to be held by the user. The user flexes his arms at the elbows to move the cable 96 back and forth against the resisting force of the effective weight stack 20a. In FIG. 8, the weight stack cable 96 is attached to a band 128 which is placed about the user's ankle. The user moves his leg back and forth against the resistance of the effective weight stack 20a.

Obviously, other exercises maybe performed using the exercise apparatus described above.

The inventor claims:

[1. In an exercise apparatus for performing a variety of exercises, the combination comprising:

a frame, a seat member mounted on said frame having front and rear ends, a backrest at the rear end of said seat member, means mounting said backrest on said frame for adjustment between a generally upright position and a forwardly inclined position relative to said seat member, and wherein said frame includes a frame member behind said backrest, and said backrest mounting means comprises means pivotally mounting said backrest on said frame member for adjustment between said upright and inclined positions, and support means for releasably retaining said backrest in said positions.]

[2. In an exercise apparatus for performing a variety of exercises, the combination comprising:

a frame, a seat member mounted on said frame having front and rear ends, a backrest at the rear end of said seat member, means mounting said backrest on said frame for adjustment between a generally upright position and a forwardly inclined position relative to said seat member, and wherein said frame includes a generally upright frame member behind said backrest, said backrest has upper and lower ends, and said backrest mounting means comprises means pivotally mounting the lower end of said backrest on said frame member for rotation to said backrest positions, a support member fixed to and extending rearwardly from said backrest toward said frame member, and means on said support member selectively engagable with said frame member for retaining said backrest in said positions, respectively.]

[3. The subject matter of claim 2, wherein:

said support member comprises a yoke having arms straddling said frame member, and said means engagable with said frame member comprises a pin insertable through holes in said arms for abutting said frame member.]

4. Exercise apparatus for performing chest and shoulder press exercises comprising:

a frame, a seat member mounted on said frame having front and rear ends, a backrest at the rear end of said seat member, means mounted said backrest on said frame for adjustment between a generally upright position and a forwardly inclined position relative to said seat member, a press arm having a lower end situated forwardly of said backrest, an upper end pivotally mounted on said frame above said seat member for swinging of said lower arm end in the fore and aft direction of said seat member, and means on said lower arm end engagable by a user positioned on said seat member and against said backrest for moving said press arm back and forth,

*an exercise member different from said press arm,* means for resisting [said press arm] movement, *of said press arm and said exercise member,*

*cable means for selectively connecting said press arm and said exercise member to said resisting means, said cable means including a pulley selectively mounted on said frame in a first position offset to one side of said seat member to support said cable means in a position for attachment to said press arm, and a second position displaced laterally from said first position to support said cable means in a position for attachment to said exercise member,* and wherein:

said backrest is adjustable to said upright position to perform a chest pressure exercise and to said inclined position to perform a shoulder press exercise.

5. Exercise apparatus according to claim 4, wherein:

said frame includes a frame member behind said backrest, and said backrest mounting means comprises means pivotally mounted said backrest on said frame member for adjustment between said upright and inclined positions, and support means for releasably retaining said backrest in said positions.

6. Exercise apparatus according to claim 4, wherein:

said frame includes a generally upright frame member behind said backrest, said backrest has upper and lower ends, and said backrest mounting means comprises means pivotally mounting the lower end of said backrest on said frame member for rotation to said backrest positions, a support member fixed to and extending rearwardly from said backrest toward said frame member, and means on said support member selectively engagable with said frame member for retaining said backrest in said positions, respectively.

7. Exercise apparatus according to claim 6, wherein:

said support member comprises a yoke having arms straddling said frame member, and said means engagable with said frame member comprises a pin insertable through holes in said arms for abutting said frame member.

8. Exercise apparatus according to claim 4, wherein:

said means for resisting movement [of said press arm] comprises a weight stack.

[9. Exercise apparatus according to claim 4, wherein:

said means for resisting movement of said press arm comprises a weight stack, means on said frame supporting said weight stack for vertical movement relative to said frame, and means including a cable connecting said weight stack at the lower end of said press arm, whereby said weight stack is elevated by movement of said press arm in one direction to resist said latter arm movement.]

[10. Exercise apparatus according to claim 9, including:

an upper pulley on said frame above said weight stack, a lower pulley on said frame adjacent the bottom of the frame, and wherein:

said cable extends from said press arm around the under side of said lower pulley and then around the upper side of said upper pulley and downwardly to said weight stack.]

[11. Exercise apparatus according to claim 10, including:

a releasable coupled between said cable and press arm, and means for adjusting the position of said lower pulley between a position to one side of said seat member wherein said cable does not obstruct chest and shoulder press exercises performed on the apparatus and a position behind said seat member to permit the use of said cable and weight stack for other exercises.]

12. Exercise apparatus for use in performing a variety of exercises, comprising:

a frame, a plurality of exercise members mounted on said frame for different prescribed exercises relative to said frame, said exercises members including (a) a press exercise arm having an upper end hinged to said frame on a generally horizontal axis and a lower end engagable by a user for swinging the arm back and forth to perform chest and shoulder press exercises, (b) a pair of upright pectoral fly exercise arms hinged to said frame on generally vertical axes and engagable by a user's forearms and hands for oscillating the pectoral fly exercise arms to perform a pectoral fly exercise, (c) a leg extension exercise arm having an upper end hinged on said frame adjacent the bottom of said frame and means on the lower end of said leg extension exercise arm engagable by a user's legs for swinging the latter back and forth to perform a leg extension exercise, means for resisting said exercise movements, seat means on said frame for a user when performing each exercise of the apparatus, said seat means comprising a seat on said frame below the lower end of said press exercise arm for a user performing said chest and shoulder press exercises, and a backrest for said seat adjustable between a generally upright position for said chest press exercise and a forwardly inclined position for said shoulder press exercise, means for selectively connecting said exercise members to said resisting means comprising cable means for selectively connecting each exercise arm to said resisting means, pulleys for guiding and supporting said cable means including a lower pulley adjacent the bottom of said frame and an upper pulley above said resisting means, [whereby] *such that* for each exercise performed on the apparatus, said cable means [can extend] *extends* from the respective exercise arm(s), around said lower pulley, then upwardly and over said upper pulley, and then downwardly to said resisting means, and means for *selectively* mounting said lower pulley on said frame in a first position offset to one side of said seat when performing said chest and press exercises, whereby said cable means does not obstruct the chest and press exercise movements of the user, and a second position *displaced laterally from said first position* to support said cable means in a position for attachment to the remaining exercise arm(s).

13. Exercise apparatus for use in performing a variety of exercises, comprising:

a frame, a plurality of exercise members mounted on said frame for different prescribed exercises relative to said frame, said exercise members including (a) a press exercise arm having an upper end hinged to said frame on a generally horizontal axis and a lower end engagable by a user for swinging the arm back and forth to perform chest and shoulder press exercises, (b) a pair of upright pectoral fly exercise arms hinged to said frame on generally vertical axes and engagable by a user's forearms and hands for oscillating the pectoral fly exercise arms to perform a pectoral fly exercise, (c) a leg extension exercise arm having an upper end hinged on said frame adjacent the bottom of said frame and means on the lower end of said leg extension exercise arm engagable by a user's legs for swinging the latter back and forth to perform a leg extension exercise, means for resisting said exercise movements, seat means on said frame for a user when performing each exercise of the apparatus comprising a seat on said frame below said press exercise arm for a user performing said chest and shoulder press exercises, a backrest for said seat adjustable between a generally upright position for said chest press exercise and a forwardly inclined position for said shoulder press exercise, and means for selectively connecting said exercise members to said resisting means comprising cable means for selectively connecting each exercise arm to said resisting means, *said cable means including a pulley selectively mounted on said frame in a first position offset to one side of said seat when performing said chest and shoulder press exercises, whereby said cable means does not obstruct the chest and shoulder press exercise movements of the user, and a second position displaced laterally from said first position to support said cable means in a position for attachment to the remaining exercise arm(s).*

* * * * *